(12) United States Patent
Zhou et al.

(10) Patent No.: US 11,853,309 B2
(45) Date of Patent: Dec. 26, 2023

(54) USER CLICK MODELLING IN SEARCH QUERIES

(71) Applicant: Home Depot Product Authority, LLC, Atlanta, GA (US)

(72) Inventors: Jianghong Zhou, Atlanta, GA (US); Sayyed Zahiri, Atlanta, GA (US); Simon Hughes, Atlanta, GA (US); Surya Kallumadi, Atlanta, GA (US); Khalifeh Al Jadda, Atlanta, GA (US); Eugene Agichtein, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 112 days.

(21) Appl. No.: 17/514,522

(22) Filed: Oct. 29, 2021

(65) Prior Publication Data

US 2022/0138209 A1 May 5, 2022

Related U.S. Application Data

(60) Provisional application No. 63/155,890, filed on Mar. 3, 2021, provisional application No. 63/108,031, filed on Oct. 30, 2020.

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/93* (2019.01); *G06N 20/00* (2019.01)

(58) Field of Classification Search
CPC .. G06F 16/24578; G06F 16/248; G06F 16/93; G06F 16/338; G06N 20/00;
(Continued)

(56) References Cited

U.S. PATENT DOCUMENTS 10,354,205 B1 * 7/2019 Pham ..................... G06N 20/00
707/E17.089
2011/0289025 A1 * 11/2011 Yan ......................... G06N 5/025
706/47

(Continued)

OTHER PUBLICATIONS

ISA/US, Int'l Search Report and Written Opinion issued in PCT/US21/57518, dated Jan. 28, 2022, 6 pgs.
(Continued)

*Primary Examiner* — Yuk Ting Choi
(74) *Attorney, Agent, or Firm* — Greenberg Traurig, LLP

(57) ABSTRACT

A method for ranking documents in search results includes defining a first training data set, the first training data set including, for each of a plurality of user queries, information respective of a document selected by a user from results responsive to the query and information respective of one or more documents within an observation window after the selected document in the results, and defining a second training data set, the second training data set including, for each of the plurality of user queries, information respective of the selected document. The method further includes training a first machine learning model with the first training data set, training a second machine learning model with the second training data set, and ranking documents of a further search result set according to the output of the first machine learning model and the output of the second machine learning model.

20 Claims, 6 Drawing Sheets

(51) Int. Cl.
  *G06F 16/93* (2019.01)
  *G06N 20/00* (2019.01)
(58) Field of Classification Search
  CPC ............ G06N 3/045; G06N 3/08; G06N 7/01; G06N 3/006
  See application file for complete search history.

(56) References Cited

U.S. PATENT DOCUMENTS

| | | | | |
|---|---|---|---|---|
| 2011/0302169 | A1* | 12/2011 | Brdiczka | G06Q 30/02 |
| | | | | 707/E17.089 |
| 2015/0347519 | A1 | 12/2015 | Hornkvist et al. | |
| 2018/0150466 | A1 | 5/2018 | Paquet et al. | |
| 2019/0130285 | A1 | 5/2019 | Snyder et al. | |
| 2019/0294692 | A1* | 9/2019 | Zhao | G06F 16/285 |
| | | | | 707/E17.089 |
| 2020/0210537 | A1* | 7/2020 | Wang | G06F 30/20 |
| | | | | 707/E17.089 |
| 2020/0372406 | A1* | 11/2020 | Wick | G06N 7/01 |
| | | | | 707/E17.089 |
| 2020/0401644 | A1* | 12/2020 | Hewlett | G06N 3/084 |
| | | | | 707/E17.089 |

OTHER PUBLICATIONS

Borisov A, Markov I, De Rijke M, Serdyukov P. A neural click model for web search. In Proceedings of the 25th International Conference on World Wide Web Apr. 11, 2016 (pp. 531-541).
Joachims T, Swaminathan A, Schnabel T. Unbiased learning-to-rank with biased feedback. In Proceedings of the Tenth ACM International Conference on Web Search and Data Mining Feb. 2, 2017 (pp. 781-789).
Craswell N, Campos D, Mitra B, Yilmaz E, Billerbeck B. Orcas: 18 Million Clicked Query-Document Pairs for Analyzing Search. arXiv preprint arXiv:2006.05324. Jun. 9, 2020.
Serdyukov P, Dupret G, Craswell N. WSCD2013: workshop on web search click data 2013. In Proceedings of the sixth ACM international conference on Web search and data mining Feb. 4, 2013 (pp. 787-788).
Chapelle O, Zhang Y. A dynamic bayesian network click model for web search ranking. In Proceedings of the 18th international conference on World wide web Apr. 20, 2009 (pp. 1-10).
Chuklin A, Markov I, Rijke MD. Click models for web search. Synthesis lectures on information concepts, retrieval, and services. Jul. 24, 2015;7(3):1-15.
Dupret GE, Piwowarski B. A user browsing model to predict search engine click data from past observations. In Proceedings of the 31st annual international ACM SIGIR conference on Research and development in information retrieval Jul. 20, 2008 (pp. 331-338).
Guo F, Liu C, Wang YM. Efficient multiple-click models in web search. In Proceedings of the second acm international conference on web search and data mining Feb. 9, 2009 (pp. 124-131).
Sutton RS, Barto AG. Reinforcement learning: An introduction. MIT press; Oct. 19, 2018.
Zhou J, Agichtein E. RLIRank: Learning to Rank with Reinforcement Learning for Dynamic Search. In Proceedings of the Web Conference Apr. 20, 2020 (pp. 2842-2848).
Zhou J, Agichtein E, Kallumadi S. Diversifying Multi-aspect Search Results Using Simpson's Diversity Index. In Proceedings of the 29th ACM International Conference on Information Knowledge Management Oct. 19, 2020 (pp. 2345-2348).
Carreira-Perpiñán M., Mode-Finding for Mixtures of Gaussian Distributions, IEEE transaction on Pattern Analysis and Machine Intelligence, vol. 22, No. 11, Nov. 2000, 1318-1323.
Guo F, Liu C, Kannan A, Minka T, Taylor M, Wang YM, Faloutsos C. Click chain model in web search. In Proceedings of the 18th international conference on World wide web Apr. 20, 2009 (pp. 11-20).
Huang Z, Xu W, Yu K. Bidirectional LSTM-CRF models for sequence tagging. arXiv preprint arXiv:1508.01991. Aug. 9, 2015.
Yang TH, Tseng TH, Chen CP. Recurrent neural network-based language models with variation in net topology, language, and granularity. In 2016 International Conference on Asian Language Processing (IALP) Nov. 21, 2016 (pp. 71-74). IEEE.
Aman Agarwal, Ivan Zaitsev, Xuanhui Wang, Cheng Li, Marc Najork, and Thorsten Joachims. 2019. Estimating position bias without intrusive interventions. In Proceedings of the Twelfth ACM International Conference on Web Search and Data Mining. 474-482.
Olivier Chapelle, Donald Metlzer, Ya Zhang, and Pierre Grinspan. 2009. Expected reciprocal rank for graded relevance. In Proceedings of the 18th ACM conference on Information and knowledge management. 621-630.
Aleksandr Chuklin, Anne Schuth, Katja Hofmann, Pavel Serdyukov, and Maarten De Rijke. 2013. Evaluating aggregated search using interleaving. In Proceedings of the 22nd ACM international conference on Information & Knowledge Management. 669-678.
Alex Krizhevsky, Ilya Sutskever, and Geoffrey E Hinton. 2012. Imagenet classification with deep convolutional neural networks. In Advances in neural information processing systems. 1097-1105.
Tao Qin, Tie-Yan Liu, Jun Xu, and Hang Li. 2010. LETOR: A benchmark collection for research on learning to rank for information retrieval. Information Retrieval 13, 4 (2010), 346-374.

\* cited by examiner

USER CLICK MODELLING IN SEARCH QUERIES

CROSS-REFERENCE TO RELATED APPLICATIONS

This application claims priority to U.S. provisional application No. 63/108,031, filed Oct. 30, 2020, and U.S. provisional application No. 63/155,890, filed Mar. 3, 2021, both of which applications are hereby incorporated by reference in their entireties.

BACKGROUND

This disclosure relates to predicting user selections in search results, for example to create and display an order for the search results, in connection with a search engine.

DETAILED DESCRIPTION

Web search engines may be improved by more accurately understanding how users interact with search results. Many important user behaviors, like reformulating or switching queries, clicking on different items, and browsing search results, may be understood through user clicks. Click logs may be used to construct a click model to measure and predict clicks on existing or future results. A click model can predict future clicks of other users, help train a learning to rank (LTR) model for result ranking, and enable automatic evaluation of search result quality. Modeling users' clicks is a challenging task because click logs are observational data, collected in-situ with a live search engine, and exhibit multiple biases. Previous research on click modeling and prediction did not directly address this issue or address these biases using heuristics, resulting in poor model performance on live (unseen) query traffic.

To overcome the aforementioned issues, the instant disclosure proposes a new model, a De-Biased Reinforcement Learning Click Model (DRLC) for training unbiased (or less biased) click models. DRLC is a Probablistic Graphical Model (PGM) based method. As a result, DRLC can be organized in a flexible way for different ranking scenarios and generate an interpretive model to reduce a variety of biases. However, unlike known PGM methods, DRLC includes reinforcement learning. This allows DRLC to takes advantage of stronger learning models (neural networks). Further, DRLC may train models, in part, on an unbiased training set, unlike known approaches.

Figure 1:
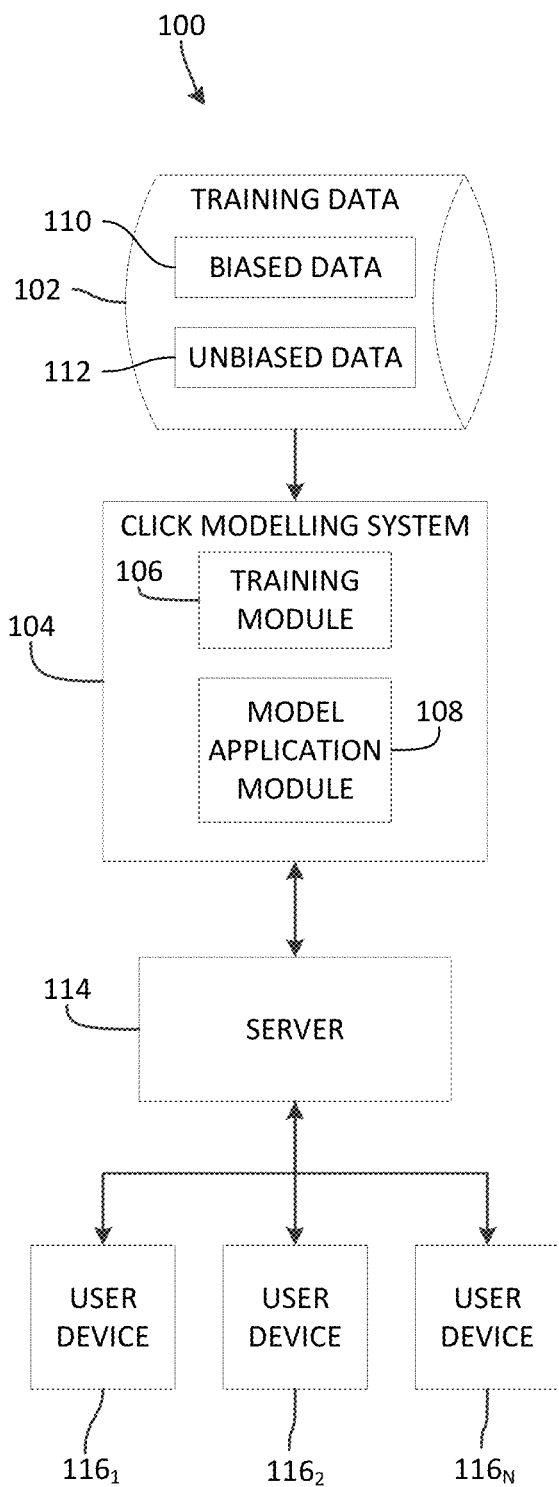
FIG. 1 is a diagrammatic view of an example system for training a user click model and applying the trained user click model to search queries.

Referring now to the drawings, wherein like numerals refer to the same or similar features in the various views, FIG. 1 is a diagrammatic view of an example system 100 for training a user click model and applying the trained user click model to search queries. The system 100 may receive and respond to search queries from users of an electronic interface (such as a search engine website or application, a search engine interface integrated into another website or application, or another electronic interface).

The system 100 may include a training data source 102 and a click modeling system 104 that may include one or more functional modules 106, 108 embodied in hardware and/or software. In an embodiment, the functional modules 106, 108 of the click modeling system 104 may be embodied in a processor and a memory storing instructions that, when executed by the processor, cause the processor to perform the functionality of one or more of the functional modules and/or other functionality of this disclosure.

The training data source 102 may include multiple types of training data. For example, in some embodiments, the training data source 102 may include biased data 110 and unbiased data 112. Both biased training data 110 and unbiased training data 112 may include a plurality of search queries, the search engine results for each query, and user behavior with respect to those results, including document selections (e.g., user clicks on document links). The unbiased data may include a plurality of search result sets and, for each search result set, each and every document on the result page above the user-selected document, but no documents below the user-selected document. The unbiased data may be a subset of the biased data, in some embodiments. For example, the biased data 110 may include a plurality of search result sets and, for each search result set, each and every document on the result page above the user-selected document and one or more documents below the user-selected document. Such data may be considered "biased" because the user may not have actually observed the document links below the clicked link on the page. Accordingly, the unbiased data 112 may include the same search results sets and corresponding user behaviors as the biased data 110, but may include only the document links that are at and above the clicked link.

The functional modules 106, 108 of the click modeling system 104 may include a training module 106 that is configured to train one or more machine learning models using historical user behavior data as training data. The training module 106 may be configured to train one or more machine learning models using the training data 110, 112. For example, the training module may train a first machine learning model on the biased training data 110 and a second machine learning model on the unbiased training data 112.

The functional modules 106, 108 may also include a model application module 108 that may use the one or more trained machine learning model(s) to, given an input of user search query, output search results or modifications to search results based on user click behavior, including predicted user click behavior. For example, the first and/or second trained machine learning models may be applied in conjunction with a search engine such that responsive documents to a search query are input to one or both models, and one or both models output a suggested ordering or priority of the responsive documents according to which are more likely to be clicked by a user.

The system 100 may further include a server 114 in electronic communication with the click modeling system 104 and with a plurality of user computing devices $116_1$, $116_2$, ... $116_N$. The server 108 may provide a website, data for a mobile application, or other interface through which the users of the user computing devices 116 may enter search queries, receive and review search results, and click on interface elements associated with the search query, with the search results, or otherwise associated with the content or organization of the electronic interface. In some embodiments, the server 114 may receive a search query from a user, provide the search query to the click modeling system 104, receive search results or modifications to search results based on user click behavior from the click modeling system 104, and provide the set of search results to the user.

Figure 2:
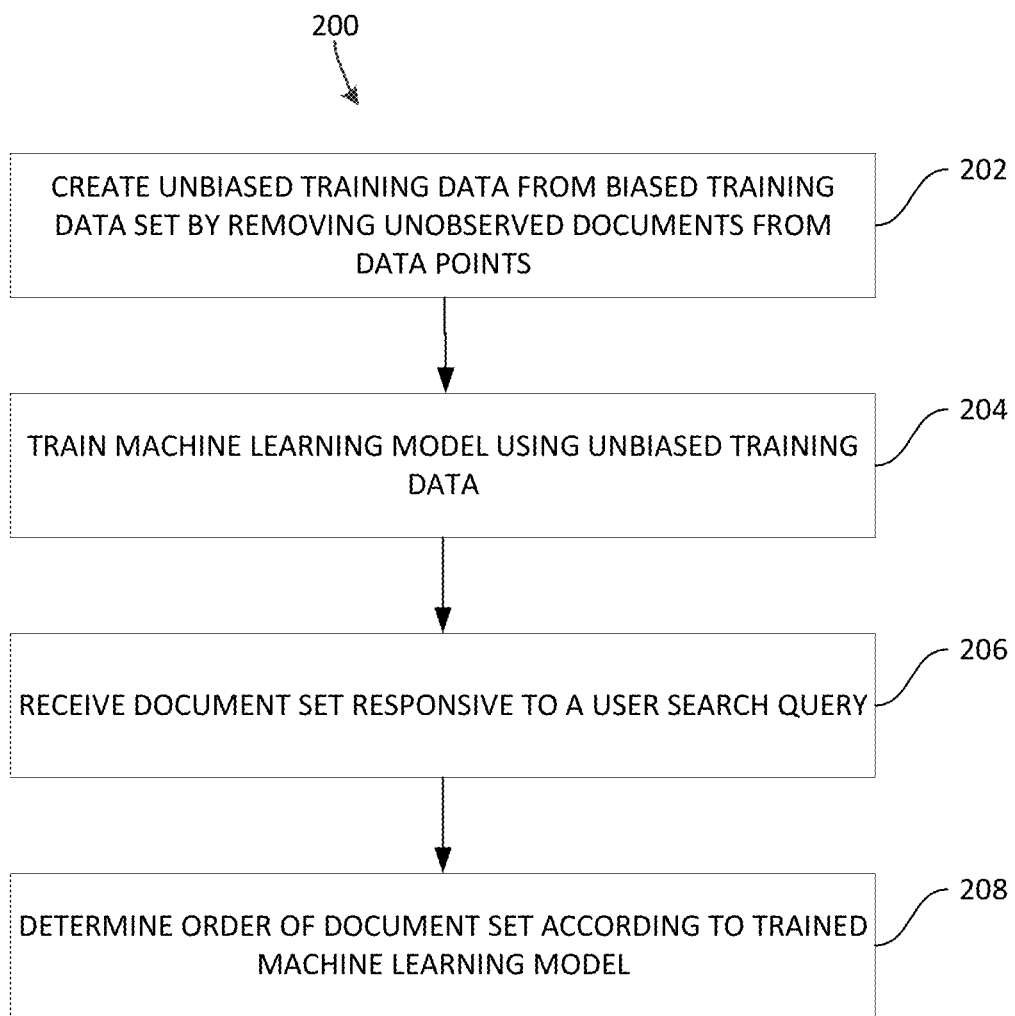
FIG. 2 is a flow chart illustrating an example method of responding to a user search query.

FIG. 2 is a flow chart illustrating an example method 200 of responding to a user search query. The method 200, or portions thereof, may be performed by the click modeling system 104, in embodiments.

The method 200 may include, at block 202, creating an unbiased training data set from a biased training data set by removing unobserved documents from data points. The biased training data set may include a plurality of data points, each data point including at least one user click (i.e., a document link on which a user clicked) and a plurality of document links that were included in the document link listing from which the user selected the clicked link. Each data point may also include a user search result to which the document links were responsive. Each data point may also include, for each of the document links in the plurality of document links, data respective of the underlying document, such as the document's content. Creating the unbiased training data may include, for each data point, removing the document links that the user did not observe, or likely did not observe, before selecting the clicked document in the data pair. In some embodiments, the document links that are below the clicked document may be removed.

The method 200 may further include, at block 204, training a first machine learning model using the unbiased training data and a second machine learning model using the biased training data. The first and second machine learning models may be convolutional neural networks (CNNs), for example. The machine learning models may be trained to accept as input one or more documents in a search result set and a user search query and may output a likelihood that the user will click on each of the one or more documents given the user search query.

The method 200 may further include, at block 206, receiving a user search query and a document set responsive to the user search query. The user search query may have been entered by a user on a web site, and the document set may have been output by a search engine deployed in conjunction with the web site. Whereas blocks 202 and 204 may be performed in a pre-deployment phase, block 206 and block 208, below, may be performed in real time responsive to the user search query.

The method 200 may further include, at block 208, ordering the document set according to the trained machine learning model(s). Block 208 may include, for example, inputting the one or more documents in the document set to both of the trained machine learning models and ordering the documents in the document set according to the respective likelihood that each document will be selected by the user so as to provide the most relevant results at the top of the result set, as that likelihood is output by each model. For example, the respective likelihood from each model may be output, and those likelihoods may be mathematically combined (e.g., through a weighted average). The ordered document set may then be presented to the user as search results responsive to the user search query.

Figure 3:
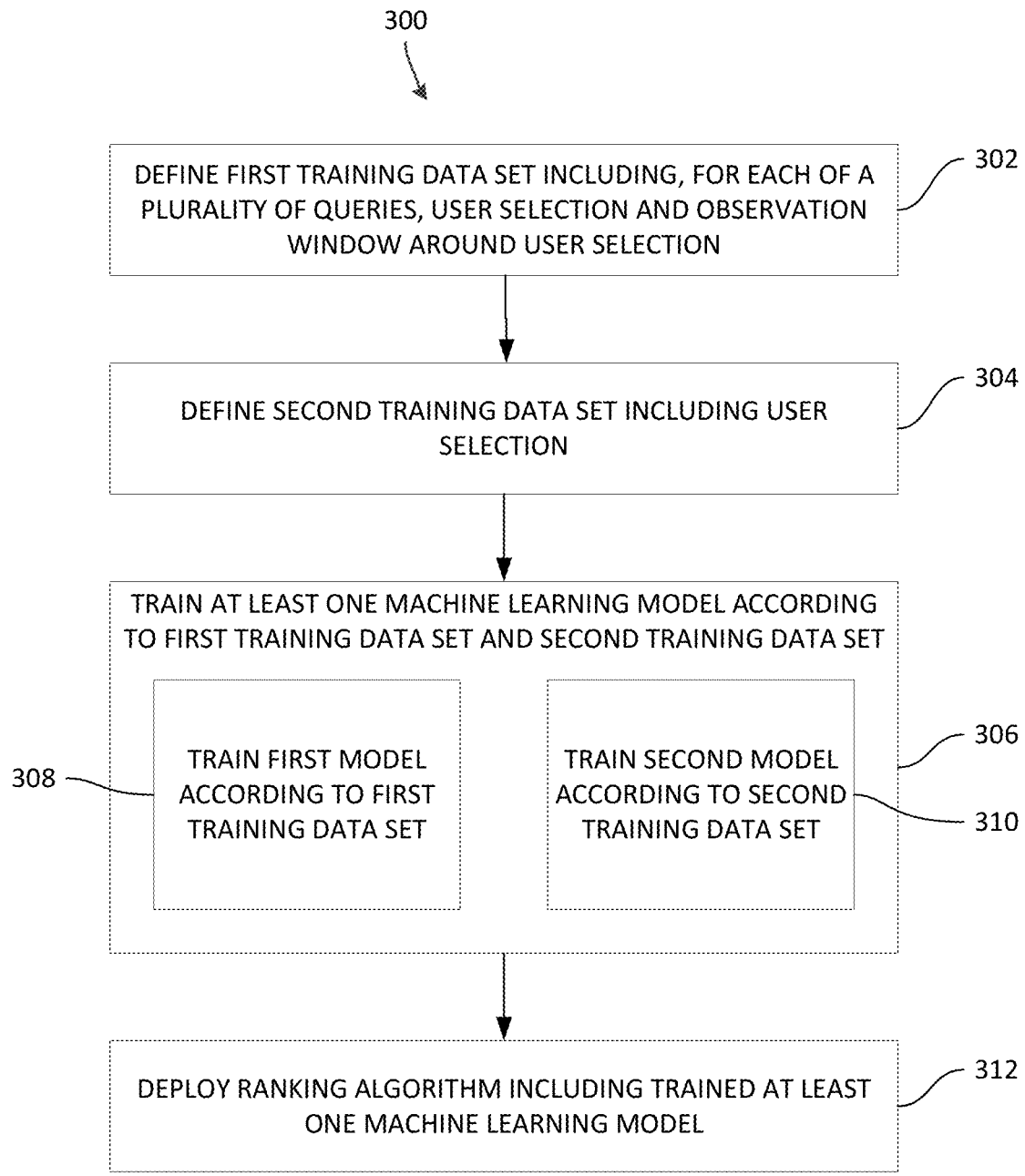
FIG. 3 is a flow chart illustrating an example method of ranking user search queries.

FIG. 3 is a flow chart illustrating an example method 300 of ranking user search queries. The method 300 overlaps with the method 200 of FIG. 2 and includes additional detail regarding the training data sets and training of the first and second machine learning models.

The method 300 may include, at block 302, defining a first training data set, the first training data set including, for each of a plurality of user queries, information respective of a document selected by a user from results responsive to the query and information respective of one or more documents within an observation window surrounding the selected document in the results.

In some embodiments, defining the first training data set may include collecting a plurality of data points, each data point including a user search query, a responsive search result set, with the search result set including an ordered set of documents returned by a search engine responsive to the search query, and the user's selection of a document from within the search result set. The data points may be collected from searches to a single search engine, or from searches to multiple search engines. The searches may have been submitted by a plurality of users.

In some embodiments, the training data may include two temporally distinct sets of searches—data points collected before any training (e.g., based on a plurality of previous user queries) and data points collected via submission to a search engine incorporating a trained machine learning model, for reinforcement training (e.g., based on one or more current user queries). As will be described below, training based on the first training data set may occur in two phases—batch pre-training and ongoing reinforcement learning.

The observation window may include a discrete number of documents below the user-selected document. For example, if a result set includes twenty documents ordered 1-20, and the user selected the fourth document, the observation window includes documents a discrete number of documents after document number four.

The number of documents below the user-selected document in the observation window may be defined to reflect the number of results a user may normally view before selecting a result. In some embodiments, the observation window may be between one and ten documents. In some embodiments, the observation window may be between one and five documents. In some embodiments, the observation window may be between one and three documents.

Defining the first training data set may including discarding, or otherwise not considering, documents in the search result sets ranked below the observation window. For example, if a result set includes twenty documents ordered 1-20, and the user selected the fourth document, and the observation window is defined to include three documents after the user-selected document, documents one through seven may be included in the data point in training data set (documents 1-4 actually having been observed), and documents eight through twenty may be discarded and not included in the first training data set. By virtue of eliminating documents below the observation window, training according to the first training data set may introduce less bias induced by the existing document ranking algorithm(s) employed by the search engine(s) from which the training data is collected, because the documents below the observation window may not have been viewed by the user, and therefore it should not be assumed that the user selected the user-selected document over the unviewed documents (and therefore those unviewed documents should not be used as negative examples in algorithm or model training).

The method 300 may further include, at block 304, defining a second training data set, the second training data set comprising, for each of the plurality of user queries, information respective of the selected document. The second training data set may also include, for each of the plurality of user queries, documents above the user-selected document (i.e., without any observation window).

Defining the second training data set may including discarding, or otherwise not considering, documents in the search result sets ranked below the user-selected document. For example, if a result set includes twenty documents ordered 1-20, and the user selected the fourth document, documents one through four may be included in the data point in training data set, and documents five through twenty may be discarded and not included in the second training data set. Accordingly, all documents below the user-selected document may be eliminated or removed to create the second training data set. By virtue of eliminating documents below the user-selected document, training according to the second training data set may avoid bias induced by the existing document ranking algorithm(s) employed by the search engine(s) from which the training data is collected, because the documents below the user-selected document may not have been viewed by the user, and therefore it should not be assumed that the user selected the user-selected document over the unviewed documents (and therefore those unviewed documents should not be used as negative examples in algorithm or model training).

In some embodiments, the second training data set may include the same user queries and responsive search result sets as the first training data set. Accordingly, the first and second training data sets may be identical but for documents in the observation window being included in the first training data set but not the second training data set, in some embodiments. In other embodiments, the second training data set may include at least some user queries and responsive search result sets that are not in the first training data set. In some embodiments, the second training data set may include completely different user queries and responsive search result sets from the first training data set.

The method 300 may further include, at block 306, training at least one machine learning model with the first training data set and the second training data set, the at least one machine learning model configured to output a predicted user document selection. In some embodiments, block 306 may include, at sub-block 308, training a first machine learning model with the first training data set, the first machine learning model configured to output a predicted user document selection. In some embodiments, block 306 may include, at sub-block 310, training a second machine learning model with the second training data set, the second machine learning model configured to output a predicted user document selection.

In some embodiments, block 306 may include batch training the at least one machine learning model according to previous user queries and responsive search result sets in the first and second training data sets, and conducting reinforcement learning training of the at least one machine learning model according to the one or more current user queries. As noted above, the current user queries, and associated search result sets, may be from search results ranked according to the batch trained at least one machine learning model. In some embodiments, the reinforcement learning may be performed to maximize a reward. In some embodiments, the reward may include a combination of a prediction accuracy of the first machine learning model and a prediction accuracy of the second machine learning model. In some embodiments, batch training may include maximizing a similar reward.

The method 300 may further include, at block 312, deploying a ranking algorithm that includes the trained at least one machine learning model and using the deployed algorithm to rank documents of a further search result set according to the output of the at least one machine learning model. In some embodiments, block 312 may include ranking the documents of the further search result set according to the output of the trained first machine learning model and the output of the trained second machine learning model, such as according to a mathematical combination of the output of the first machine learning model and the output of the second machine learning model. In some embodiments, block 312 may include displaying the ranked further search result set to a user.

Figure 4:
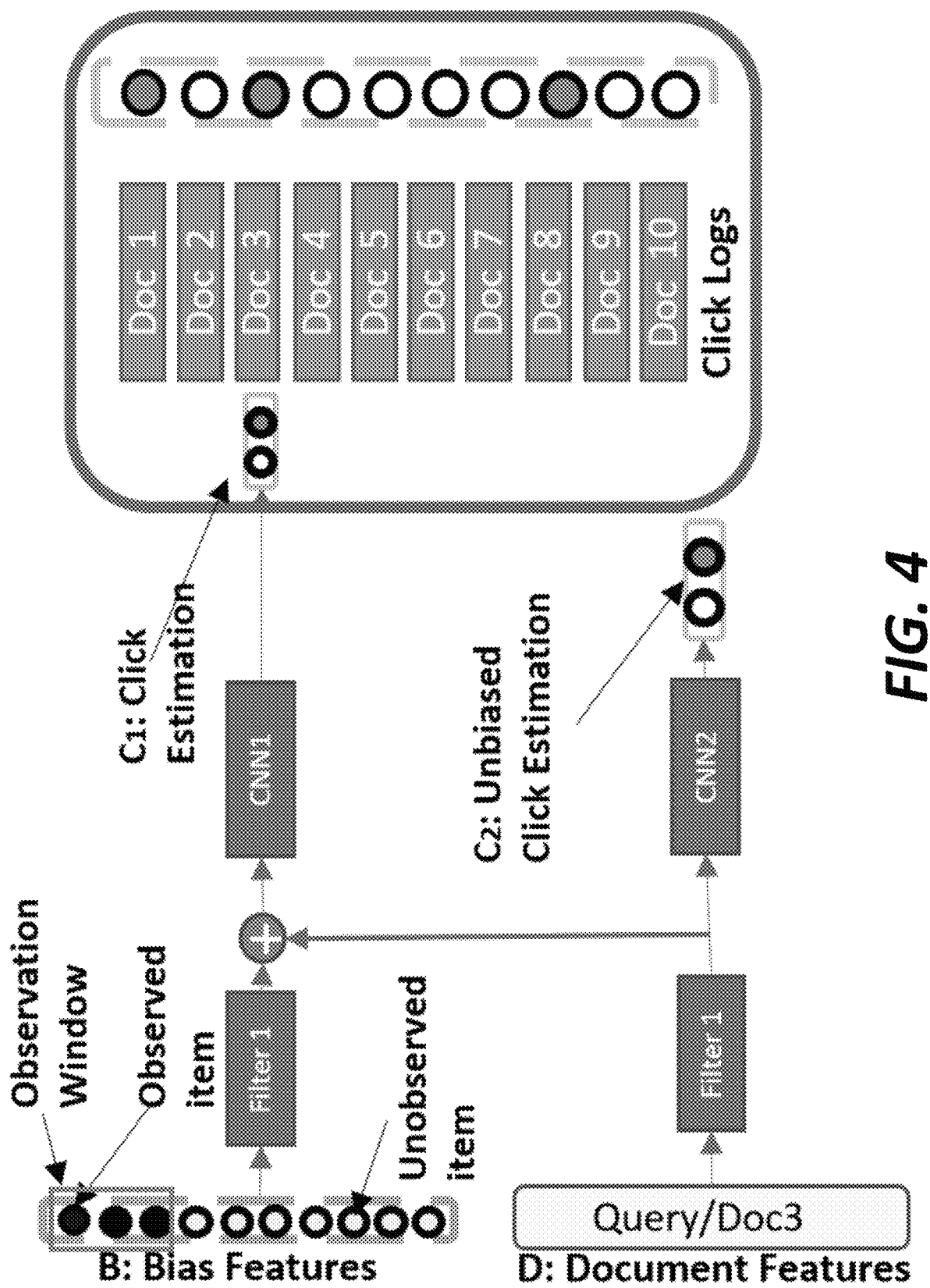
FIG. 4 is a diagrammatic view of an example value network system for training two machine learning algorithms to rank search results.

FIG. 4 is a diagrammatic view of an example value network system for training two machine learning algorithms to rank search results (e.g., as described above with respect to block 306). The value network system may include the first and second training data sets, training data filters, and two value networks CNN1, CNN2.

The value networks may be machine learning models, such as Convolutional Neural Networks (CNNs), in some embodiments. CNN1 is a bias network. The input features, for a given search result set, are the bias features B and the document features D. B is a vector representing the observation situation of the search results, having a respective value for each document in the search result set. In some embodiments, the observation situation may be Boolean; if the document is observed (i.e., within a selected document, above the selected document, or within a defined observation window), the vector value for that document is 1, and if not it is 0. D is a vector representing the features of a document. Those features are related to both the query and the document, including but not limited to the frequency or quantity of appearances of the query in the document and whether or not the user selected the document. The output of CNN1 is the click estimation (i.e., prediction of the likelihood that a user will select a given document from within a set of search results) with bias. CNN2 is a de-biased network, whose output is the de-biased click estimation or the possibility of clicking the item under the de-biased setting. The input of CNN2 is D.

Batch Pre-training: Because the two networks CNN1, CNN2 focus on two aspects of the dataset, the two networks may be batch pre-trained in different ways. First, CNN1 may be batch trained with the whole training dataset, which is a highly biased dataset. For the observation features B, it may be assumed that the users observe the documents sequentially with an observation window. If a given document appeared in the window before the user-selected document, or within an observation window after the user-selected document, it is denoted as observed. If not, it is denoted as not observed. The size of the observation window may be set by empirical estimation, in some embodiments.

Second, CNN2 may be batch pre-trained by a de-biased dataset. For example, CNN2 may be pre-trained only with the user-selected documents and the documents before the user-selected document.

CNN Architecture. CNNs may be appropriate neural networks for the value network because browsing a website, or recreation of a user's browsing, is a computing vision problem. CNNs have a very successful application in this kind of problem. The input of the CNN1 may be an 100×1 vector (bias features B), in some embodiments, and a 56×1 vector (document features D), in some embodiments. The document features may be generated from URL associated with the document and/or from the document itself, in embodiments. The selection of features may be based on (e.g., the features selected may be the same as or similar to) feature selections in known large datasets, such as the LETOR dataset available from Microsoft®, in some embodiments. The features selected may vary from embodiment to embodiment.

In some embodiments, each CNN may include three convolutional blocks. Each convolutional block may include 16 filters of kernel 3×1 with stride 1, a batch normalization layer, and a ReLU layer. The output layer may be a fully connected network. The loss function may be a softmax function. After pre-training, the networks CNN1, CNN2 may be deployed for use with real-time searches and initialized to be trained further by reinforcement learning.

Figure 5:
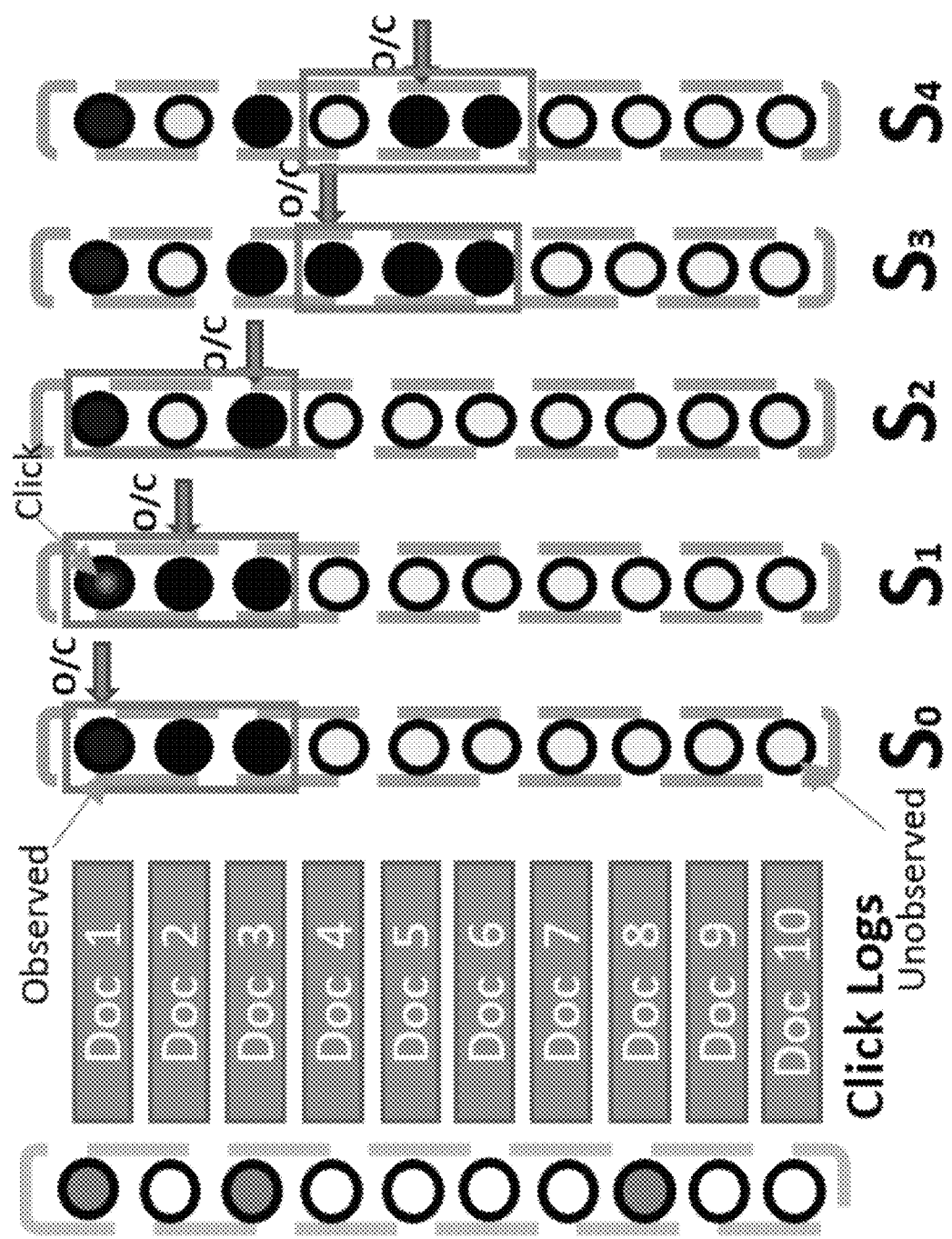
FIG. 5 is a diagrammatic view of a reinforcement learning process for ongoing training of one or more machine learning algorithms to rank search results.

FIG. 5 is a diagrammatic view of a reinforcement learning (RL) process for ongoing training of one or more machine learning algorithms to rank search results. As is known in the art, the RL process include state S, action A, transition T, and reward R. State S is the click state and observation state of the document. Here again, an observation window may be applied, in which a user is assumed to have observed every document above the selected document and a discrete number of documents below the selected document for RL on the first machine learning model CNN1. Action A is selecting the state of a document at the position. Those states include: (Observed, Clicked), (Observed, Not clicked), and (Unobserved, Not clicked). The transition T changes the document state in S based on A. Reward R is how well the estimated click probabilities match the empirical distribution observed in click logs.

Reinforcement learning proceeds according to equation (1) below:

$$R_t = (C_t - C_{t,1})^2 + O_t(C_t - C_{t,2})^2 \quad (\text{Eq. 1})$$

where t is the position of the document, Cr is the actual click (i.e., selected document) of the training data, $C_{t,1}$ is the click prediction from CNN1, $C_{t,2}$ is the click prediction from CNN2, β is a scaling parameter for the de-biased prediction, and $O_t$ is the observation state of the document. The value of β may be set in order to emphasize, or de-emphasize, the impact of the de-biased model on the overall predictions of the equation. Training calculates the reward $R_t$ based on a mathematical combination of the respective prediction accuracies of the two models, CNN1 and CNN2. Equation (1) incorporates two assumptions. First, if the document is clicked in the click logs, it is observed (i.e., $O_t$ reflects an observed document). Second, if $C_{t,1}/C_{t,2} < \theta$, the document may be classified as unobserved. This second assumption is based on the bias effect, which is $P(O_t)C_{t,2} = C_{t,1}$. If $P(O_t)$ is small, it means the possibility of the observation is low. θ may be set empirically, and may have a value of 0.3, in embodiments.

The goal of the RL is to learn a policy π* to maximize $\mathbb{R} = \Sigma \gamma^t R_t$, i.e., to maximize the cumulative reward across the training data set. In turn that means learning the value of each state, corresponding to click probability. After deployment, $CNN_1$ may be further trained (via RL) by the results of the final state ST, where T is the total number of the documents in the click log. $CNN_2$ may be further trained via RL based on debiased data sets, also by the results of the final state ST.

Experimental Results—Datasets. The click prediction model proposed herein was tested against two open-source datasets—the ORCAS dataset and the Yandex click dataset—and one real interactive dataset from a large e-commerce website ("RID" in Table 2 below). ORCAS is a click-based dataset associated with the TREC Deep Learning Track. It covers 1.4 million of TREC DL documents, providing 18 million connections to 10 million distinct queries. The Yandex click dataset comes from the Yandex search engine, containing more than 30 million search sessions. Each session contains at least one search query together with 10 ranked items. The e-commerce website dataset ("RID") includes three months of search logs from a large retailer. In this dataset, the users normally search for several queries. For each query, the search engine returns a list of products and then the user can interact with the results by clicking, adding the items to the cart and ordering. Table 1 shows a sample of the data. With the product ID (e.g., SKU), the page of the product (i.e., document associated with the product) may be referenced to extract the features of the product in the same manner as the LETOR dataset.

| visitor ID | session id | date | time | searchterm | click sku | atc sku | order sku | product impression |
|---|---|---|---|---|---|---|---|---|
| 1000 | 1000-mobile-1 | Jun. 1, 2020 | 6:30 pm | everbilt dropcloth | 2034 | | | 3072\|2034\|2037\|2036 |
| 1000 | 1000-mobile-1 | Jun. 1, 2020 | 6:34 pm | pull down shades | 3022 | 3022 | 3022 | 3022\|2051\|3042\|2071 |
| 1001 | 1001-mobile-1 | Jun. 1, 2020 | 6:36 pm | fence panel | | | | 2030\|1003\|2024\|1000 |
| 1001 | 1001-mobile-2 | Jun. 1, 2020 | 6:38 pm | fince dog ears | 2053 | | | 2055\|2034\|3034\|2053 |

Experimental Results—Metrics. The model was evaluated from two aspects. The first aspect was based on the click prediction. The second aspect was based on relevance. In terms of click prediction, log-likelihood and perplexity were used as the evaluation methodology. Discounted cumulative gain (nDCG) was used as a relevance prediction metric.

Experimental Results—Baselines. Known click models—DBN, DCM, CCM, UBM and NCM—were used as baselines. These methods are the based on PGM and neural networks.

Experimental Results—Results and Discussion. The results of the experiments are summarized in Table 2 below. The empirical results show that the methodology of the present disclosure (noted as DRLC in table 2) outperforms all baseline methods in terms of click prediction by 3.4% to 5.2%. Based on a T test to evaluate statistical significance, this improvement is substantial. For the ranking prediction, DRLC outperforms the other baselines when the ranking number is 10.

TABLE 2

| Dataset | Model | Perplexity | Log-likelihood | NDCD@1 | NDCG@3 | NDCG@5 | NDCG@10 |
|---|---|---|---|---|---|---|---|
| ORCAS Dataset | DBN | 1.4628 | −0.2273 | 0.596 | 0.606 | 0.623 | 0.655 |
| | DCM | 1.4647 | −0.2894 | 0.609 | 0.618 | 0.639 | 0.662 |
| | CCM | 1.4664 | −0.2778 | 0.615 | 0.626 | 0.637 | 0.671 |
| | UBM | 1.4593 | −0.2203 | 0.599 | 0.608 | 0.628 | 0.656 |
| | NCM | 1.4545 | −0.2186 | 0.617 | 0.625 | 0.639 | 0.677 |
| | DRLC | 1.4326 | −0.2037 | 0.610 | 0.624 | 0.645 | 0.686 |
| Yandex Click Dataset | DBN | 1.3562 | −0.2789 | 0.702 | 0.724 | 0.766 | 0.841 |
| | DCM | 1.3605 | −0.3594 | 0.729 | 0.744 | 0.775 | 0.845 |
| | CCM | 1.3688 | −0.3522 | 0.746 | 0.757 | 0.779 | 0.848 |
| | UBM | 1.3422 | −0.2667 | 0.729 | 0.739 | 0.769 | 0.841 |
| | NCM | 1.3406 | −0.2522 | 0.756 | 0.763 | 0.788 | 0.846 |
| | DRLC | 1.3283 | −0.2393 | 0.729 | 0.754 | 0.776 | 0.848 |
| RID dataset | DBN | 1.3777 | −0.2267 | 0.543 | 0.578 | 0.598 | 0.605 |
| | DCM | 1.3764 | −0.2873 | 0.566 | 0.587 | 0.603 | 0.611 |
| | CCM | 1.3872 | −0.2983 | 0.511 | 0.601 | 0.608 | 0.621 |
| | UBM | 1.3899 | −0.2637 | 0.538 | 0.612 | 0.618 | 0.632 |
| | NCM | 1.3937 | −0.2433 | 0.556 | 0.617 | 0.623 | 0.638 |
| | DRLC | 1.3554 | −0.2232 | 0.616 | 0.624 | 0.645 | 0.648 |

In experimental results, DRLC predicted clicks better than known methods and shows improvement relative to known models in terms of ranking prediction. The improvement of the click prediction may result from incorporation of the concept of observation in training (i.e., eliminating some or all unobserved document from training data). In the past, unobserved data has been hard to account for in training, because it is almost impossible to manually label the data as observed documents or unobserved ones. However, in the framework herein, users may be assumed to browse search results sequentially. In this way, the value networks may classify whether each document is observed.

Figure 6:
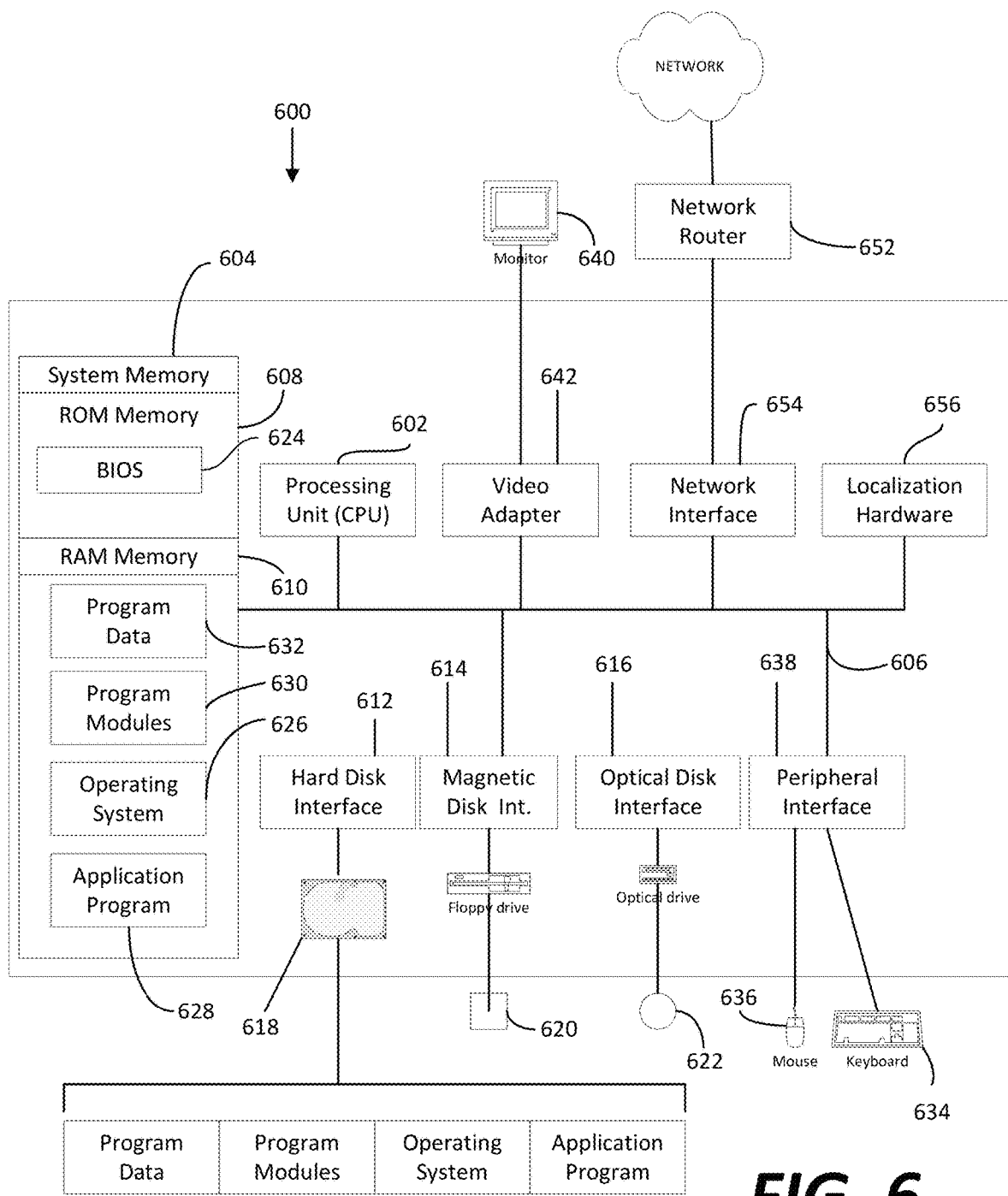
FIG. 6 is a diagrammatic view of an example embodiment of a user computing environment.

FIG. 6 is a diagrammatic view of an example embodiment of a user computing environment that includes a general purpose computing system environment 600, such as a desktop computer, laptop, smartphone, tablet, or any other such device having the ability to execute instructions, such as those stored within a non-transient, computer-readable medium. Furthermore, while described and illustrated in the context of a single computing system 600, those skilled in the art will also appreciate that the various tasks described hereinafter may be practiced in a distributed environment having multiple computing systems 600 linked via a local or wide-area network in which the executable instructions may be associated with and/or executed by one or more of multiple computing systems 600.

In its most basic configuration, computing system environment 600 typically includes at least one processing unit 602 and at least one memory 604, which may be linked via a bus 606. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus 606, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard drive 618, and/or peripheral memory devices may be used to store computer executable instructions comprising an operating system 626, one or more applications programs 628 (which may include the functionality of the click modeling system 104 of FIG. 1, for example), other program modules 630, and/or program data 622. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus 606. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus 606 via an interface, such as via video adapter 632.

In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 652, that is responsible for network routing. Communications with the network router 652 may be performed via a network interface component 654. Thus, within such a networked environment, e.g., the Internet, World Wide Web, LAN, or other like type of wired or wireless net work, it will be appreciated that program modules depicted relative to the computing system environment 600, or portions thereof, may be stored in the memory storage device(s) of the computing system environment 600.

The computing system environment 600 may also include localization hardware 656 for determining a location of the computing system environment 600. In embodiments, the localization hardware 656 may include, for example only, a GPS antenna, an RFID chip or reader, a WiFi antenna, or other computing hardware that may be used to capture or transmit signals that may be used to determine the location of the computing system environment 600.

The computing environment 600, or portions thereof, may comprise one or more components of the system 100 of FIG. 1, in embodiments.

In a first aspect of the present disclosure, a method for ranking documents in search results is provided. The method includes defining a first training data set, the first training data set including, for each of a plurality of user queries, information respective of a document selected by a user from results responsive to the query and information respective of one or more documents within an observation window after the selected document in the results, defining a second training data set, the second training data set including, for each of the plurality of user queries, information respective of the selected document, training a first machine learning model with the first training data set, the first machine learning model configured to output a predicted user document selection, training a second machine learning model with the second training data set, the second machine learning model configured to output a predicted user document selection, and ranking documents of a further search result set according to the output of the first machine learning model and the output of the second machine learning model.

In an embodiment of the first aspect, training the first machine learning model and training the second machine learning model includes conducting reinforcement learning on the first machine learning model and the second machine learning model to maximize a reward, the reward including a combination of a prediction accuracy of the first machine learning model and a prediction accuracy of the second machine learning model.

In an embodiment of the first aspect, the observation window includes between one and three documents after the selected document.

In an embodiment of the first aspect, the plurality of user queries includes a plurality of previous user queries and one or more current user queries, and training the first machine learning model with the first training data set and training the second machine learning model with the second training data set includes batch training the first machine learning model and the second machine learning model according to the previous user queries, and conducting reinforcement learning on the first machine learning model and the second machine learning model according to the one or more current user queries.

In an embodiment of the first aspect, conducting reinforcement learning includes maximizing a reward, the reward including a combination of a prediction accuracy of the first machine learning model and a prediction accuracy of the second machine learning model.

In an embodiment of the first aspect, the method further includes receiving the documents of the further search result set, the further search result set responsive to a further search query, and inputting information respective of the documents to the first machine learning model and the second machine learning model, wherein ranking documents of a further search result set according to the output of the first machine learning model and the output of the second machine learning model includes ranking the documents of the further search result set according to a mathematical combination of the output of the first machine learning model and the output of the second machine learning model.

In an embodiment of the first aspect, the method further includes displaying the ranked further search result set to a user.

In a second aspect of the present disclosure, a method for ranking documents in search results is provided. The method includes defining a first training data set, the first training data set including, for each of a plurality of user queries, information respective of a document selected by a user from results responsive to the query and information respective of one or more documents within an observation window surrounding the selected document in the results, defining a second training data set, the second training data set including, for each of the plurality of user queries, information respective of the selected document, training at least one machine learning model with the first training data set and the second training data set, the at least one machine learning model configured to output a predicted user document selection, and ranking documents of a further search result set according to the output of the at least one machine learning model.

In an embodiment of the second aspect, training the at least one machine learning model includes conducting reinforcement learning on the at least one machine learning model to maximize a reward, the reward including a prediction accuracy of the at least one machine learning model.

In an embodiment of the second aspect, the observation window includes between one and three documents after the selected document.

In an embodiment of the second aspect, the plurality of user queries includes a plurality of previous user queries and one or more current user queries, and training the at least one machine learning model includes batch training the at least one machine learning model according to the previous user queries and conducting reinforcement learning on the at least one machine learning model according to the one or more current user queries.

In an embodiment of the second aspect, conducting reinforcement learning includes maximizing a reward, the reward including a prediction accuracy of the at least one machine learning model.

In an embodiment of the second aspect, the method further includes receiving the documents of the further search result set, the further search result set responsive to a further search query, and inputting information respective of the documents to the at least one machine learning model.

In an embodiment of the second aspect, the method further includes displaying the ranked further search result set to a user.

In a third aspect of the present disclosure, a system is provided. The system includes a non-transitory, computer-readable medium storing instructions and a processor configured to execute the instructions to: define a first training data set, the first training data set including, for each of a plurality of user queries, information respective of a document selected by a user from results responsive to the query and information respective of one or more documents within an observation window surrounding the selected document in the results; define a second training data set, the second training data set including, for each of the plurality of user queries, information respective of the selected document; train at least one machine learning model with the first training data set and the second training data set, the at least one machine learning model configured to output a predicted user document selection; and rank documents of a further search result set according to the output of the at least one machine learning model.

In an embodiment of the third aspect, training the at least one machine learning model includes conducting reinforcement learning on the at least one machine learning model to maximize a reward, the reward including a prediction accuracy of the at least one machine learning model.

In an embodiment of the third aspect, the observation window includes between one and three documents after the selected document.

In an embodiment of the third aspect, the plurality of user queries includes a plurality of previous user queries and one or more current user queries, and training the at least one machine learning model includes batch training the at least one machine learning model according to the previous user queries and conducting reinforcement learning on the at least one machine learning model according to the one or more current user queries.

In an embodiment of the third aspect, conducting reinforcement learning includes maximizing a reward, the reward including a prediction accuracy of the at least one machine learning model.

In an embodiment of the third aspect, the processor is configured to execute the instructions further to receive the documents of the further search result set, the further search result set responsive to a further search query and to input information respective of the documents to the at least one machine learning model.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for ranking documents in search results, the method comprising:
    defining a first training data set, the first training data set comprising, for each of a plurality of user queries, first information respective of a document selected by a user from results responsive to the query and second information respective of one or more documents within an observation window after the selected document in the results, the one or more documents within the observation window being different than the selected document;
    defining a second training data set, the second training data set comprising, for each of the plurality of user queries, the first information respective of the selected document;
    training a first machine learning model with the first training data set, the first machine learning model configured to output a first predicted user document selection;
    training a second machine learning model with the second training data set, the second machine learning model configured to output a second predicted user document selection; and
    ranking documents of a further search result set according to the output of the first machine learning model and the output of the second machine learning model.

2. The method of claim 1, wherein training the first machine learning model and training the second machine learning model comprises:

conducting reinforcement learning on the first machine learning model and the second machine learning model to maximize a reward, the reward comprising a combination of a prediction accuracy of the first machine learning model and a prediction accuracy of the second machine learning model.

3. The method of claim 1, wherein the observation window includes between one and three documents after the selected document.

4. The method of claim 1, wherein:
the plurality of user queries comprises:
a plurality of previous user queries; and
one or more current user queries; and
training the first machine learning model with the first training data set and training the second machine learning model with the second training data set comprises:
batch training the first machine learning model and the second machine learning model according to the previous user queries; and
conducting reinforcement learning on the first machine learning model and the second machine learning model according to the one or more current user queries.

5. The method of claim 4, wherein conducting reinforcement learning comprises maximizing a reward, the reward comprising a combination of a prediction accuracy of the first machine learning model and a prediction accuracy of the second machine learning model.

6. The method of claim 1, further comprising:
receiving the documents of the further search result set, the further search result set responsive to a further search query; and
inputting information respective of the documents to the first machine learning model and the second machine learning model;
wherein ranking documents of a further search result set according to the output of the first machine learning model and the output of the second machine learning model comprises ranking the documents of the further search result set according to a mathematical combination of the output of the first machine learning model and the output of the second machine learning model.

7. The method of claim 1, further comprising:
displaying the ranked further search result set to a user.

8. A method for ranking documents in search results, the method comprising:
defining a first training data set, the first training data set comprising, for each of a plurality of user queries, first information respective of a document selected by a user from results responsive to the query and second information respective of one or more documents within an observation window surrounding the selected document in the results, the one or more documents within the observation window being different than the selected document;
defining a second training data set, the second training data set comprising, for each of the plurality of user queries, the first information respective of the selected document;
training at least one machine learning model with the first training data set and the second training data set, the at least one machine learning model configured to output a predicted user document selection; and
ranking documents of a further search result set according to the output of the at least one machine learning model.

9. The method of claim 8, wherein training the at least one machine learning model comprises:
conducting reinforcement learning on the at least one machine learning model to maximize a reward, the reward comprising a prediction accuracy of the at least one machine learning model.

10. The method of claim 8, wherein the observation window includes between one and three documents after the selected document.

11. The method of claim 8, wherein:
the plurality of user queries comprises:
a plurality of previous user queries; and
one or more current user queries; and
training the at least one machine learning model comprises:
batch training the at least one machine learning model according to the previous user queries; and
conducting reinforcement learning on the at least one machine learning model according to the one or more current user queries.

12. The method of claim 11, wherein conducting reinforcement learning comprises maximizing a reward, the reward comprising a prediction accuracy of the at least one machine learning model.

13. The method of claim 8, further comprising:
receiving the documents of the further search result set, the further search result set responsive to a further search query; and
inputting information respective of the documents to the at least one machine learning model.

14. The method of claim 8, further comprising:
displaying the ranked further search result set to a user.

15. A system comprising:
a non-transitory, computer-readable medium storing instructions; and
a processor configured to execute the instructions to:
define a first training data set, the first training data set comprising, for each of a plurality of user queries, first information respective of a document selected by a user from results responsive to the query and second information respective of one or more documents within an observation window surrounding the selected document in the results, the one or more documents within the observation window being different than the selected document;
define a second training data set, the second training data set comprising, for each of the plurality of user queries, the first information respective of the selected document;
train at least one machine learning model with the first training data set and the second training data set, the at least one machine learning model configured to output a predicted user document selection; and
rank documents of a further search result set according to the output of the at least one machine learning model.

16. The system of claim 15, wherein training the at least one machine learning model comprises:
conducting reinforcement learning on the at least one machine learning model to maximize a reward, the reward comprising a prediction accuracy of the at least one machine learning model.

17. The system of claim 15, wherein the observation window includes between one and three documents after the selected document.

18. The system of claim 15, wherein:
the plurality of user queries comprises:
- a plurality of previous user queries; and
- one or more current user queries; and training the at least one machine learning model comprises:
- batch training the at least one machine learning model according to the previous user queries; and
- conducting reinforcement learning on the at least one machine learning model according to the one or more current user queries.

19. The system of claim 18, wherein conducting reinforcement learning comprises maximizing a reward, the reward comprising a prediction accuracy of the at least one machine learning model.

20. The system of claim 15, wherein the processor is configured to execute the instructions further to:
- receive the documents of the further search result set, the further search result set responsive to a further search query; and
- input information respective of the documents to the at least one machine learning model.

* * * * *